United States Patent
Morita et al.

(10) Patent No.: US 6,402,661 B2
(45) Date of Patent: Jun. 11, 2002

(54) APPARATUS FOR CONTROLLING AN AUTOMATIC TRANSMISSION

(75) Inventors: Yukio Morita; Kazuyuki Konnno; Kenji Hagiwara; Takamichi Shimada, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/737,556

(22) Filed: Dec. 18, 2000

(30) Foreign Application Priority Data

Feb. 14, 2000 (JP) ........................................ 2000-035476

(51) Int. Cl.[7] .............................................. B60K 41/04
(52) U.S. Cl. ..................................................... 477/108
(58) Field of Search ........................... 477/108; 180/170

(56) References Cited

U.S. PATENT DOCUMENTS 5,521,823 A * 5/1996 Akita et al. ............... 364/424.1
6,175,797 B1 * 1/2001 Iizuka ........................ 701/51

* cited by examiner

Primary Examiner—Dirk Wright
(74) Attorney, Agent, or Firm—Arent Fox Kintner Plotkin & Kahn, PLLC

(57) ABSTRACT

An automatic gear change controller, having a constant speed travel mode, which can transmit torque to wheels of a vehicle according to changes in the travel load of the vehicle even though a gear shift mode is changed to the manual gear shift mode. When the gear shift mode is set in the manual gear shift mode and the travel mode is set in a constant speed travel mode, a constant speed travel controller generates a downshift command signal. In this case, when the accelerator pedal is depressed beyond a predetermined amount, the gear shift stage of the automatic transmission is downshifted.

2 Claims, 4 Drawing Sheets

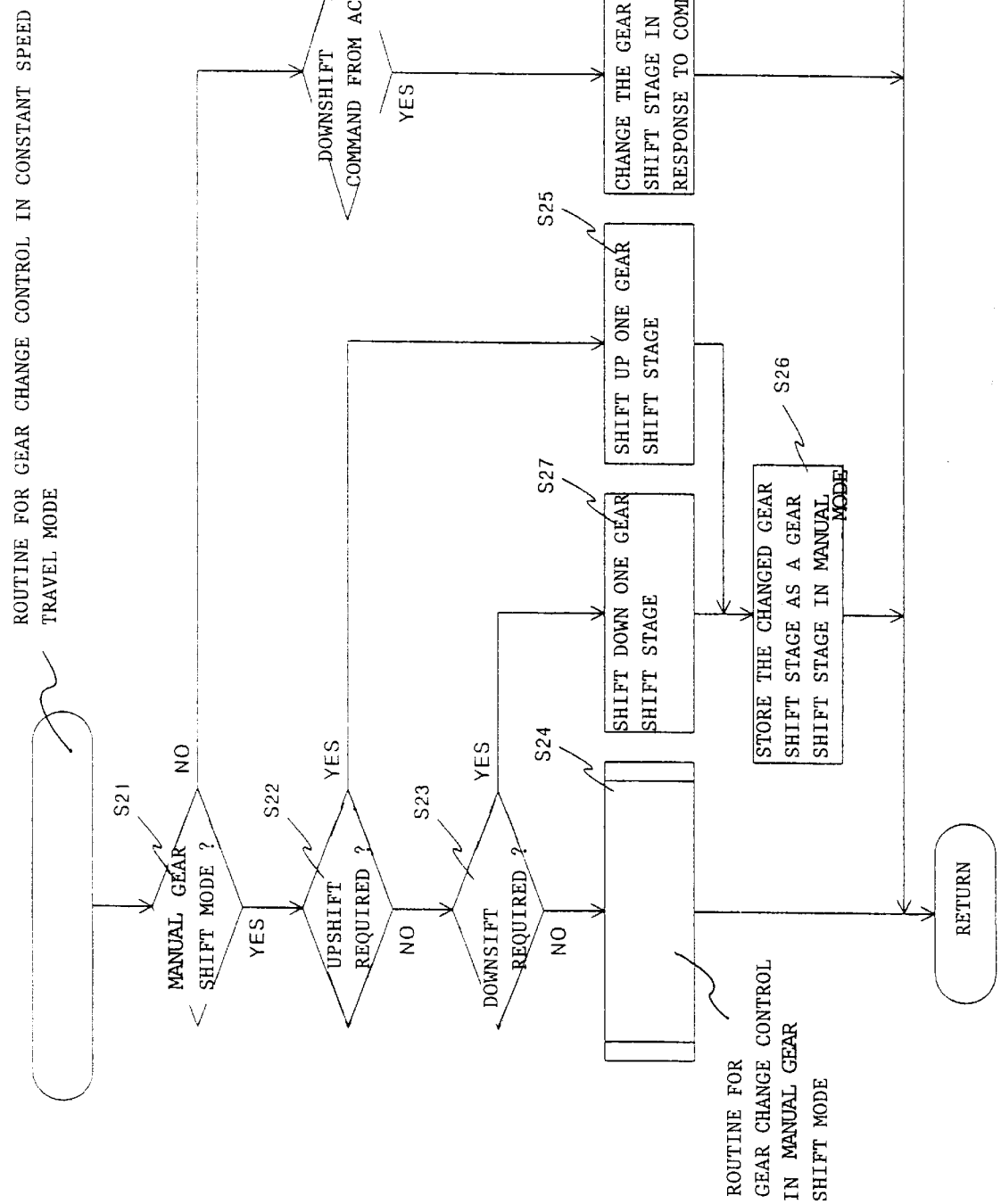

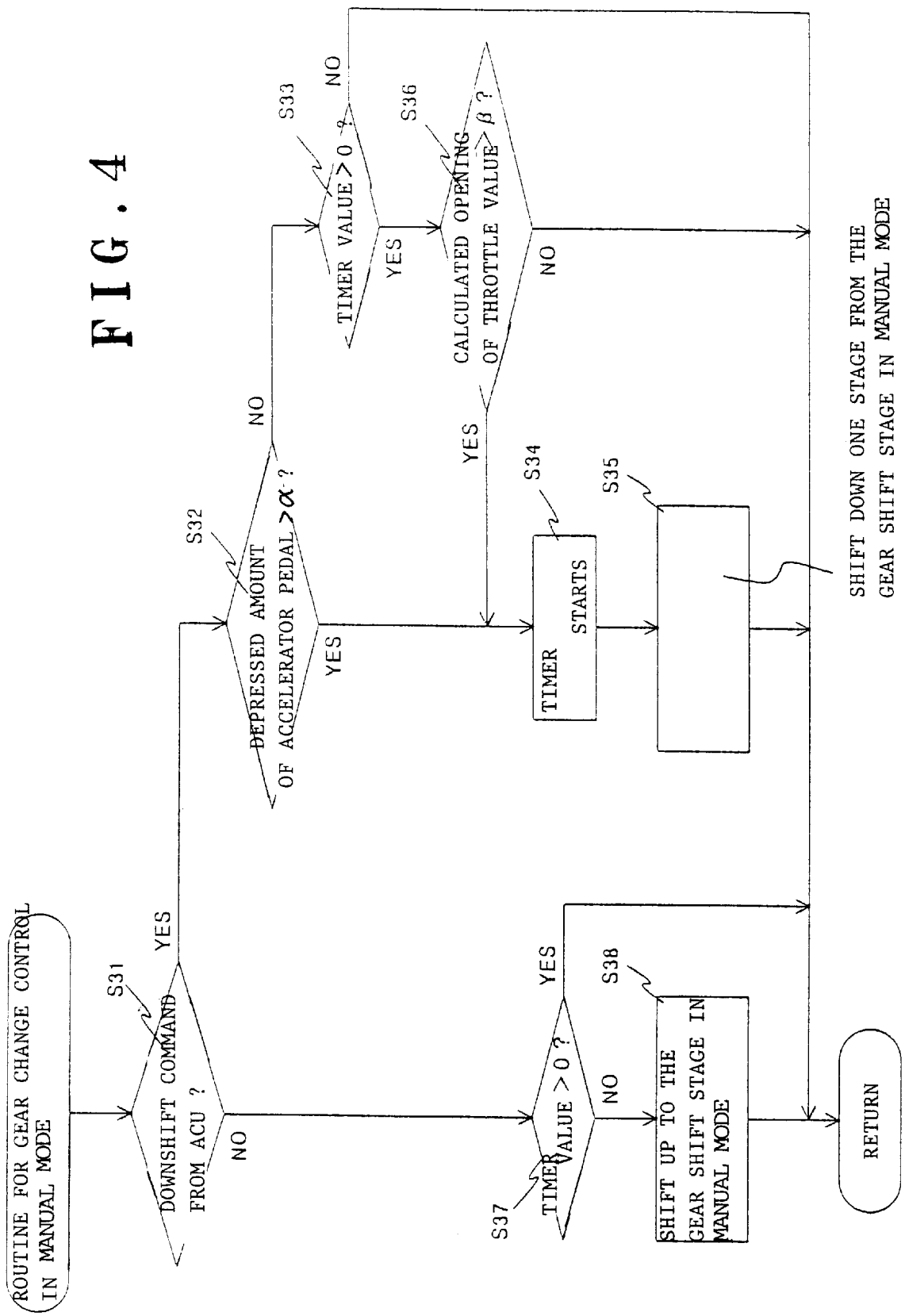

APPARATUS FOR CONTROLLING AN AUTOMATIC TRANSMISSION

BACKGROUND OF THE INVENTION

1. Field of the Invention

The present invention relates to an apparatus for controlling an automatic transmission of a vehicle and, more particularly, to an apparatus for controlling an automatic transmission which selectively sets either of two gear shift modes, an automatic gear shift mode and a manual gear shift mode, and controls the automatic transmission according to the set gear shift mode.

2. Description of the Related Art

An apparatus for controlling an automatic transmission of a vehicle is disclosed in Japanese patent application laid-open No. 8-193656. The device has a gear change controller, which selectively sets either of two gear shift modes, an automatic gear shift mode and a manual gear shift mode. The device controls the automatic transmission according to the set gear shift mode and a constant speed travel controller controls the travel speed so as to be substantially constant when the travel mode of a vehicle is set in constant speed travel mode. With the gear shift mode being set in the manual gear shift mode and the travel mode being set in a constant speed travel mode, when the constant speed travel controller gives a gear change command, the conventional automatic gear change controller ignores the given gear change command and maintains the previously set gear shift stage.

Such a conventional automatic gear change controller, however, has a problem in maintaining a constant travel speed. That is, even though the travel load of a vehicle is changed, for example, when the road elevation changes from being level to an uphill, no control is carried out for changing the gear shift stage, causing difficulty in maintaining constant vehicle speed.

OBJECT AND SUMMARY OF THE INVENTION

The present invention was developed in consideration of the aforementioned problems. An object of the present invention is to provide an automatic gear change controller which can maintain constant travel speed with the travel mode being set in a constant speed travel mode even though the gear shift mode is changed to the manual gear shift mode or the travel load of a vehicle changes.

An apparatus for controlling an automatic transmission according to the present invention comprises a transmission driving means for determining the gear shift stage of an automatic transmission which transmits rotational torque of an internal combustion engine to drive wheels of a vehicle in response to a gear change control signal; a gear change control means for selectively setting either of two gear shift modes, an automatic gear shift mode to determine the gear shift stage according to the travel speed, the amount of depression of the accelerator pedal and the throttle valve opening, and a manual gear shift mode to determine the gear shift stage corresponding to a shift position of the operating lever, and for determining the contents of said gear change control signal according to the set gear shift mode; a travel mode setting means for setting whether or not the travel state of the vehicle is to be a constant speed travel mode corresponding to manual operation; and a constant speed travel control means for giving a command signal for changing the gear shift stage to the gear change control means so as to make said travel speed substantially constant, and for giving a command signal for changing the valve opening to a throttle valve control means when said gear shift mode is set in the automatic gear shift mode and the travel mode is set in the constant speed travel mode, characterized in that, when the gear shift mode is set in manual gear shift mode and the travel mode is set in constant speed travel mode, the constant speed travel control means gives a downshift command signal and, when the accelerator pedal is depressed beyond a predetermined amount, the gear change control means shifts down the gear shift stage.

That is, according to the present invention, with the travel mode being set to the constant speed travel mode, torque can be transmitted to the wheels according to changes in the travel load of a vehicle even though the gear shift mode is changed to manual gear shift mode.

BRIEF DESCRIPTION OF THE DRAWINGS

FIG. 3 is a flow chart showing a subroutine for determining the gear shift stage of an automatic transmission when the travel state of a vehicle is in constant speed travel mode; and FIG. 4 is a flow chart showing a subroutine for gear change control carried out in step S24 in manual gear shift mode.

DETAILED DESCRIPTION OF THE EMBODIMENTS

Referring to the accompanying drawings, embodiments of the present invention will be described below.

Figure 1:
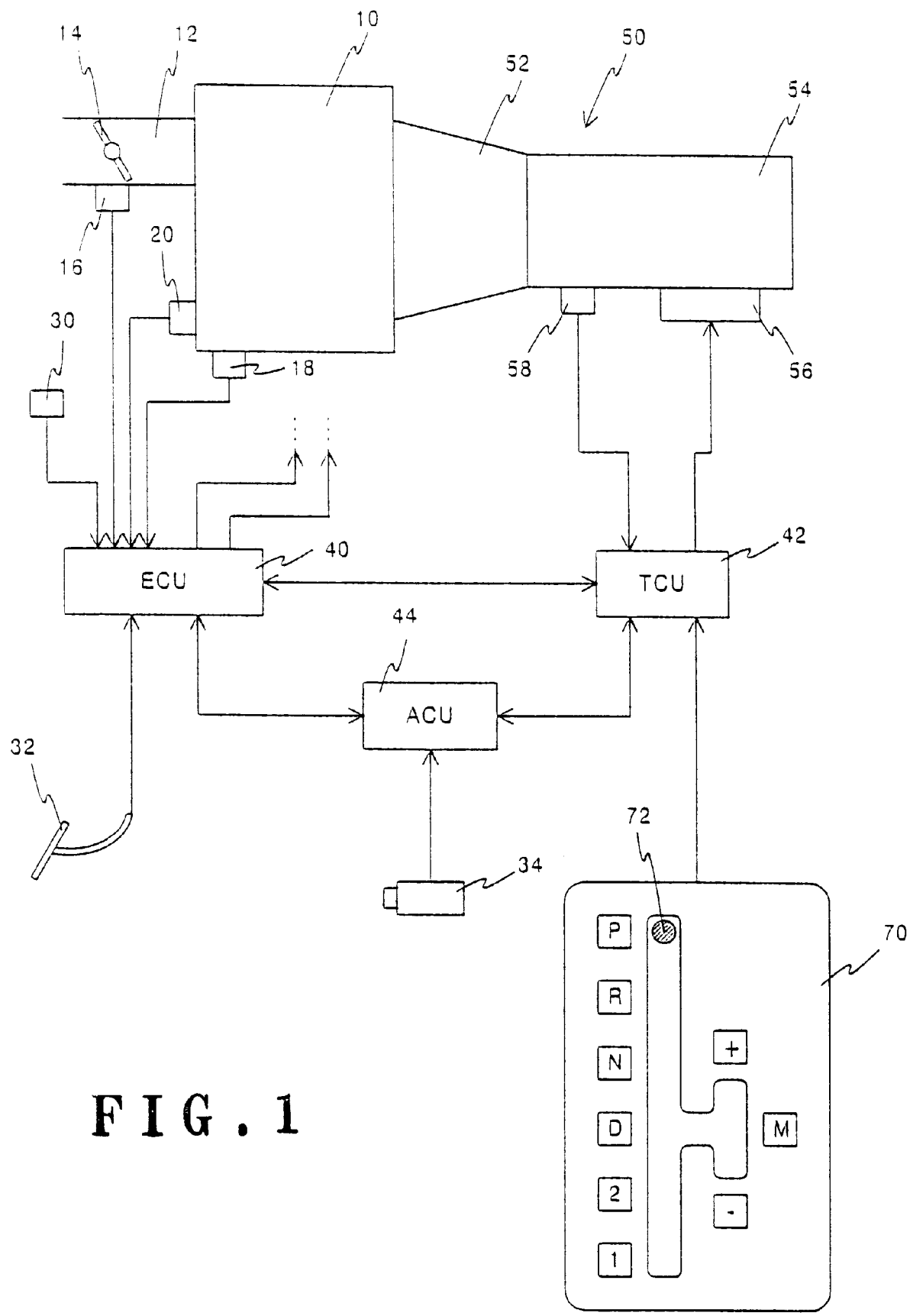
FIG. 1 is a block diagram showing an apparatus for controlling an automatic transmission and an internal combustion engine installed in a vehicle.

FIG. 1 shows an outline of an apparatus for controlling an automatic transmission and the gear shift stage thereof.

An inlet pipe or intake manifold 12 of an internal combustion engine 10 is provided with a throttle valve 14 for controlling the volume of intake air sucked from the outside of a vehicle. The throttle valve 14 is provided with a throttle valve running gear (not shown) for switching and running the throttle valve 14 in response to a throttle valve switching control signal as described later. The throttle valve 14 is further provided with a throttle valve opening sensor 16 for detecting the opening of the throttle valve 14. The inlet pipe 12 is also provided with an intake pipe pressure sensor for detecting the pressure of intake air and an intake-air temperature sensor (not shown) for detecting the temperature of intake air. The inlet pipe 12 is further provided with a fuel injector (not shown) for injecting fuel. The internal combustion engine 10 sucks a mixture of intake air and fuel injected from the fuel injector and rotatively drives a crankshaft (not shown) by burning the air-fuel mixture. The internal combustion engine 10 is provided with a temperature sensor 18 for detecting the temperature of the internal combustion engine 10. In the vicinity of the crankshaft, a crank angle sensor 20 is provided for detecting the angle of the crankshaft. The air-fuel mixture burned in the internal combustion engine 10 is discharged to an exhaust pipe or exhaust manifold (not shown) as exhaust gases. The exhaust pipe is provided with an oxygen concentration sensor (not shown) for detecting the concentration of oxygen in the exhaust gases. In the vicinity of the internal combustion engine 10, an atmospheric pressure sensor (not shown) is also provided for detecting atmospheric pressure.

A speed sensor 30 for detecting the speed of a vehicle is provided in the vicinity of drive wheels (not shown) of the vehicle. The device wheels are driven by rotational torque transmitted from the internal combustion engine 10. The speed sensor 30 gives an output signal corresponding to the detected vehicle speed. Also provided in the interior of the vehicle are an accelerator pedal 32, with which an operator controls the travel speed of the vehicle, and an accelerator pedal sensor (not shown) arranged near the accelerator pedal 32. The accelerator pedal sensor detects the amount of depression of the accelerator pedal 32 which is depressed by the operator and gives an output signal corresponding to the depressed amount.

The output signals generaged from various sensors such as the throttle valve opening sensor 16 and the accelerator pedal sensor are amplified to predetermined voltage signals by an amplifier circuit (not shown) and supplied to an electronic control unit (hereinafter referred to as ECU) 40. The ECU 40 comprises a central processing unit (hereinafter referred to as CPU) (not shown), a read only memory (hereinafter referred to as ROM) (not shown), a random access memory (hereinafter referred to as RAM) (not shown), a multiplexer (hereinafter referred to as MPX) (not shown) and an analog-to-digital converter (hereinafter referred to as A/D converter) (not shown). Output signals generated from the sensors are supplied to the MPX. The MPX is a switch which selectively supplies one of the output signals generated by the sensors to the A/D converter in response to a command transmitted from the CPU at a predetermined timing. A supplied sensor output signal is converted to a digital signal by the A/D converter and supplied to an input/output bus (not shown). The input/output bus is designed such that data signals or address signals are input to and/or output from the CPU, and connected with the ROM and RAM. A digital signal converted by the A/D converter is supplied to the RAM. Data designated by the supplied digital signal are stored in the RAM as sensor output data.

Furthermore, connected with the above-mentioned input/output bus is a drive circuit (not shown) for driving a fuel injector and the throttle valve 14. The CPU supplies a fuel injection control signal to a fuel injector, and the fuel injector drives a fuel injection valve (not shown) in response to the fuel injection control signal to control the supply volume of fuel. The CPU also supplies a throttle valve switching control signal to a throttle valve drive unit, and the throttle valve drive unit controls opening and closing of the throttle valve 14 in response to the throttle valve switching control signal.

The above-described internal combustion engine 10 is provided with an automatic transmission 50. The automatic transmission 50 comprises a torque converter 52, a transmission main unit 54 and a hydraulic controller 56. The transmission main unit 54 has multiple pairs of planetary gears (not shown), and hydraulic actuated friction engaging members (not shown) such as hydraulic clutches and hydraulic brakes. The hydraulic controller 56 has an electromagnetic valve for controlling hydraulic circuits and oil pressure. The automatic transmission 50 changes the rotational frequency of the internal combustion engine 10 to a predetermined rotational frequency in response to a gear change control signal to be described, and transmits torque of the internal combustion engine 10 to the drive wheels of the vehicle. A rotational frequency sensor 58 is provided in the vicinity of the axis of rotation (not shown) of the transmission main unit 54. The rotational frequency sensor 58 detects the rotational frequency changed by the automatic transmission 50 and generates an output signal corresponding to the detected rotational frequency. The output signal generated from the rotational frequency sensor 58 is supplied to a transmission control unit (hereinafter referred to as TCU) 42. The TCU 42 has a CPU (not shown), a ROM (not shown), a RAM (not shown), an MPX (not shown) and an A/D converter (not shown). The output signal generated from the rotational frequency sensor 58 is processed in a similar manner to the signal processing carried out in the ECU 40 and the output value designated by the output signal is stored in the RAM as data of rotational frequency.

A shift unit 70 is connected with the TCU 42. The shift unit 70 is provided in the vicinity of the operator's seat in a vehicle. The shift unit 70 has shift positions designated as 'P', 'R', 'N', 'D', '2', '1' and 'M'. The shift unit 70 generates an output signal corresponding to the shift position where an operator positions the operating lever 72, and the output signal is supplied to the TCU 42. When the operating lever 72 is positioned at a shift position 'P', 'R', 'N', 'D', '2' or '1', the automatic gear shift mode is set, and when the operating lever 72 is positioned at the shift position 'M', the manual gear shift mode is set. When the operating lever 72 is positioned at the shift position 'M' and the manual gear shift mode is set, the operating lever 72 is always energized so as to make the shift position 'M' the home position thereof. With such configuration, even though the operator depresses the operating lever 72 to positions '+' or '−', the operating lever 72 returns to the shift position 'M' when the operator releases the operating lever 72. With the gear shift mode being set in manual gear shift mode, the shift unit 70 gives an output signal to the TCU 42 so that one gear shift stage of the transmission is shifted up when the operating lever 72 is depressed once to the '+' position, and one gear shift stage of the transmission is shifted down when the operating lever 72 is depressed once to the '−' position.

The TCU 42 is connected to an auto cruise control unit (hereinafter referred to as ACU) 44. The ACU 44 has a CPU (not shown), a ROM (not shown), a RAM (not shown), an MPX (not shown) and an A/D converter (not shown). A cruise control switch 34 is connected with the ACU 44. The cruise control switch 34, which is provided in the vicinity of the steering wheel, is a switch for setting or selecting whether or not the travel state of a vehicle is to be in constant speed travel mode in response to the operator's manual operation. When the cruise control switch 34 is changed to the constant speed travel mode, the travel speed at the time of the operation of the cruise control switch 34 is stored in the RAM of the ACU 44 as a target speed.

The above-mentioned ECU 40, TCU 42 and ACU 44 are connected with each other by communication signal cables. Each of the processing units of the ECU 40, TCU 42 and ACU 44 transmits and receives each other's data obtained by each processing unit and data obtained through operating processing carried out by each of the processing units. For example, the ECU 40 supplies the speed, the depressed amount of the accelerator pedal and the opening of the throttle valve detected by the throttle valve opening sensor 16 to the TCU 42, and the speed to the ACU 44. The TCU 42 also supplies the throttle valve opening obtained through operating processing to the ECU 40.

With the configuration described above, the TCU 42 transmits a gear change control signal to the hydraulic controller 56 according to supplied information, and determines the gear shift stage of the automatic transmission 50 by actuating the hydraulic friction engaging members of the transmission main unit 54. The ACU 44 calculates the deviation between the speed detected by the speed sensor 30

(hereinafter referred to as detected speed) and the target speed, and calculates the target throttle valve opening and the gear shift stage based on the detected speed so as to generate command signals so as to eliminate any deviation; a command signal for changing the valve opening for controlling the throttle valve opening and a command signal for changing the gear shift stage for controlling the gear shift stage. Hereinafter, the calculated throttle valve opening will be referred to as the calculated throttle valve opening, and the calculated gear shift stage will be referred to as the calculated gear shift stage. The ACU 44 generates a command signal for changing the valve opening in response to the calculated throttle valve opening and transmits a command signal for changing the valve opening to the ECU 40. The ACU 44 generates a command signal for changing the gear shift stage in response to the calculated gear shift stage, and transmits a command signal for changing the gear shift stage to the TCU 42. The command signal for changing the gear shift stage comprises a downshift command signal generated when the ACU 44 determines that the gear shift stage should be downshifted, and an upshift command signal generated when the ACU 44 determines that the gear shift stage should be upshifted.

The travel mode setting means is configured from the above-mentioned cruise control switch 34, the gear change control means is configured from the TCU 42 and the shift unit 70, the constant speed travel control means is configured from the ACU 44, and the transmission driving means is configured from the hydraulic controller 56.

Hereinafter, the description is premised on the completion of initialization of variables and flags used in the CPU of each of the ECU 40, TCU 42 and ACU 44. The description is given also on the premise that driving units and controllers of the internal combustion engine or the automatic transmission have undergone processing at starting and has been operating constantly. Furthermore, it is a premise that programs composed of subroutines shown in FIGS. 2, 3 and 4 are stored in the ROM of the TCU 42 beforehand, and the CPU of the TCU 42 calls and carries out these programs at a predetermined timing.

Figure 2:
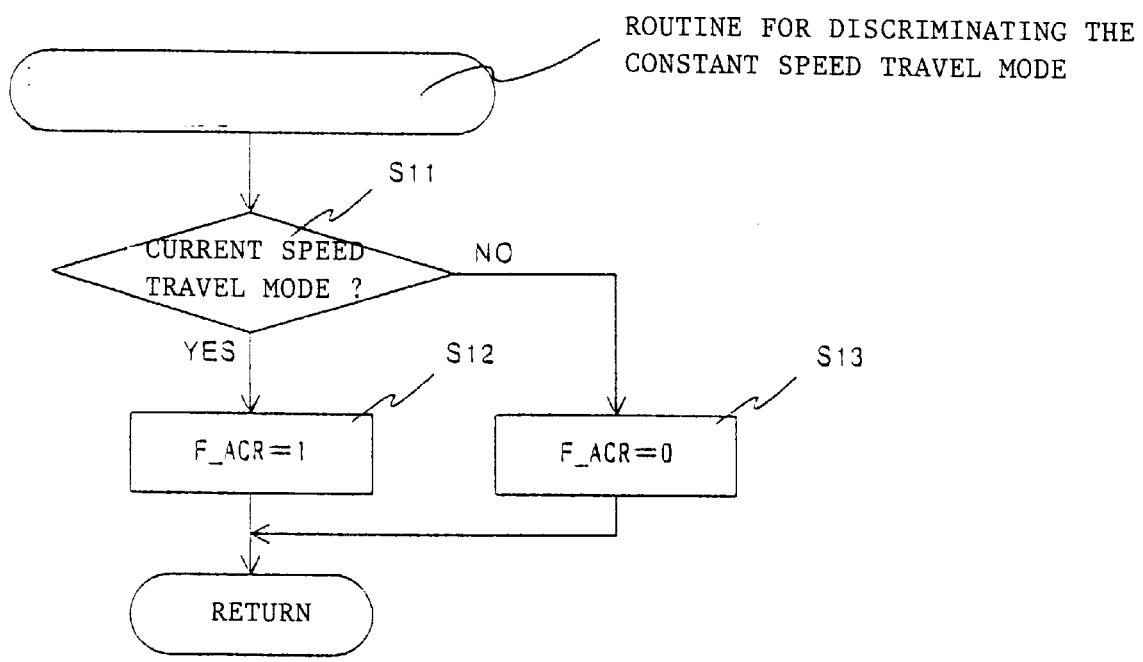
FIG. 2 is a flow chart showing a subroutine for discriminating whether or not the travel state of a vehicle is in constant speed travel mode.

FIG. 2 shows a subroutine for discriminating whether or not the travel state of a vehicle is in constant speed travel mode. This determination processing is called and carried out every predetermined time while the main routine (not shown) is being carried out.

First, the state of the cruise control switch 34 is detected and a determination is made whether it is in the constant speed travel mode or not (step S11). When the state is determined as being in the constant speed travel mode, the subroutine is terminated immediately after the value of flag F_ACR is set to 1 (step S12). When the state is determined as not being in the constant speed travel mode in step S11, the subroutine is terminated immediately after the value of flag F_ACR is set to 0 (step S13).

The subroutine for determining the gear shift stage of an automatic transmission when the travel state of a vehicle is in the constant speed travel mode is shown in FIG. 3. This processing is called and carried out every predetermined time while the main routine (not shown) is being carried out when the value of flag F_ACR is 1, that is, when the travel state of a vehicle is in the constant speed travel mode.

First, it is detected whether or not the operating lever 72 of the shift unit 70 is positioned at the shift position 'M' (step S21). When the operating lever 72 is determined as being positioned at the shift position 'M', the gear shift mode is determined as being in the manual gear shift mode, and, whether the operating lever 72 is depressed to the shift position '+' or not is detected (step S22). When it is determined that the operating lever 72 is not depressed to the shift position '+', whether the operating lever 72 is depressed to the shift position '−' or not is detected (step S23). When it is determined that the operating lever 72 is not depressed to the shift position '−' either, the gear change control routine in manual gear shift mode shown in FIG. 4 is carried out (step S24).

In step S22 as described above, when the operating lever 72 is determined to be depressed to the shift position '+', the TCU 42 gives a gear change control signal to the hydraulic controller 56 so as to shift up one gear shift stage of the automatic transmission (step S25), and the changed gear shift stage is stored as the gear shift stage in the manual mode (step S26), terminating the subroutine. In step S23, when it is determined that the operating lever 72 is depressed to the shift position '−', the TCU 42 gives a gear change control signal to the hydraulic controller 56 so that one gear shift stage of the automatic transmission is shifted down (step S27). The subroutine is terminated after the step S26 is carried out.

In step S21, when the gear shift mode is determined as being in the automatic gear shift mode, it is determined whether the ACU 44 has generated a downshift command signal or not (step S28). When it is determined that a downshift command signal has been generated from the ACU 44, a gear change control signal is transmitted to the hydraulic controller 56 so as to shift down one gear shift stage of the automatic transmission in response to the downshift command signal (step S29) and the subroutine is terminated. Meanwhile, when it is determined that no downshift command signal has been generated from the ACU 44 in step S28, a gear shift stage is retrieved according to the throttle valve opening and the travel speed from the shift map stored in advance in the ROM of the TCU 42, and a gear change control signal corresponding to the retrieved gear shift stage is transmitted to the hydraulic controller 56 (step S30) and the subroutine is terminated.

FIG. 4 shows a subroutine for controlling a gear change in the manual gear shift mode carried out in step S24.

First, it is decided determined whether the ACU 44 has generated a downshift command signal or not (step S31). When it is determined that the ACU 44 has generated a downshift command signal, it is determined whether the depressed amount of the accelerator pedal is greater than the predetermined amount $\alpha$ or not (step S32). When it is determined that the depressed amount of the accelerator pedal is less than the predetermined amount $\alpha$, it is determined whether a timer value to be described is greater than 0 or not (step S33). When the timer value is determined as being less than 0, the subroutine is immediately terminated. The case described above occurs when the operator is determined as having no intention of accelerating even though a command signal requiring downshift has been generated from the ACU 44. In such a case, the subroutine is terminated without changing the gear shift stage.

When the depressed amount of the accelerator pedal is determined as being greater than the predetermined amount $\alpha$ in step S32, the timer is activated (step S34). The timer starts the counting operation, setting the predetermined positive value as a timer value, reduces the timer value as time passes and stops the counting operation when the timer value becomes 0. Then, a gear change control signal is transmitted to the hydraulic controller 56 so as to shift down one stage from the manual gear shift stage stored in step S26

(step S35) and the subroutine is terminated. The case described above occurs when the ACU 44 generates a command signal requiring downshift and the operator is determined as having an intention of accelerating the vehicle. In such a case, one stage is shifted down from the gear shift stage in the manual mode.

When the operator reduces the depressed amount of the accelerator pedal after the timer was started in step S34, it is determined that the depressed amount of the accelerator pedal is less than the predetermined amount α in step S32, and that the timer value is greater than 0 in step S33. In this case, it is determined whether the calculated throttle valve opening is greater than the predetermined value β or not (step S36). When the calculated throttle valve opening is determined as being greater than the predetermined value β, the subroutine is terminated after the timer is started again in step S34 and then step S35 is carried out. In this case, as one gear shift stage has already been shifted down from the gear shift stage in manual mode as described above, the subroutine is terminated without changing the gear shift stage in step S35.

Meanwhile, when the calculated throttle valve opening is determined as being less than the predetermined value β in step S36, the subroutine is immediately terminated. In this case, it is determined that the operator has no intention of increasing the speed because of the reduced depressed amount of the accelerator pedal even though a command signal for requiring downshift is generated from the ACU 44 after downshift of the gear shift stage. In such a case, the subroutine is terminated without changing the gear shift stage until the predetermined time passes, that is, until the timer value becomes 0.

In step S31, when it is determined that no downshift command signal has been generated from the ACU 44, it is determined whether the timer value is greater than 0 or not (step S37). When the timer value is determined as being greater than 0, the subroutine is immediately terminated. This case occurs when it is determined that no command signal for requiring downshift has been transmitted from the ACU 44 after downshift of the gear shift stage and that the operator has no intention of increasing the speed because of the reduced depressed amount of the accelerator pedal. In such a case, too, the subroutine is terminated without changing the gear shift stage until the timer value becomes 0.

In step S37, when the timer value is determined as being zero (0) or below 0, a gear change control signal for shifting up the gear shift stage is transmitted to the hydraulic controller 56 so as to return the gear shift stage to the stage in the manual mode (step S38) and the subroutine is terminated. This case occurs when the predetermined time is determined as having passed because the timer value becomes 0. In such a case, the gear shift stage is returned to the stage in manual mode.

As described above, an apparatus for controlling an automatic transmission according to the present invention can transmit torque to drive wheels of a vehicle corresponding to changes in the travel load of a vehicle with the travel mode being set in constant speed travel mode even though the gear shift mode is changed to the manual gear shift mode. In this manner, stable travel of the vehicle is achieved.

What is claimed is:

1. An apparatus for controlling an automatic transmission, comprising:

transmission driving means for determining a gear shift stage of an automatic transmission which transmits rotational torque of an internal combustion engine of a vehicle to drive wheels of said vehicle in response to a gear change control signal;

gear change control means for selectively setting either of two gear shift modes, an automatic gear shift mode to determine the gear shift stage according to a travel speed of the vehicle, a depressed amount of an accelerator pedal and engine throttle valve opening, and a manual gear shift mode to determine the gear shift stage corresponding to a shift position of a transmission operating lever, and for determining control characteristics of said gear change control signal according to a set gear shift mode;

travel mode selecting means for selecting whether a travel state of said vehicle is to be in a constant speed travel mode corresponding to manual operation; and constant speed travel control means for transmitting a command signal for changing the gear shift stage to said gear change control means so as to make said travel speed substantially constant, and for transmitting a command signal for changing the throttle valve opening to a throttle valve control means when said gear shift mode is set in said automatic gear shift mode and said travel mode is set in said constant speed travel mode, wherein when said gear shift mode is set in said manual gear shift mode and said travel mode is set in said constant speed travel mode, said constant speed travel control means transmits a downshift command signal and, when the accelerator pedal is depressed beyond a predetermined amount, said gear change control means shifts down the gear shift stage.

2. An apparatus for controlling automatic transmission according to claim 1, wherein said gear change control means shifts up the gear shift stage when the throttle valve opening designated by said command signal for changing the throttle valve opening is less than a predetermined value.

* * * * *